United States Patent
Maekawa

(10) Patent No.: US 6,192,208 B1
(45) Date of Patent: Feb. 20, 2001

(54) PRINTING APPARATUS, CONTROL METHOD FOR THE SAME, AND COMPUTER-READABLE STORAGE MEDIUM STORING PRINTING-APPARATUS CONTROL PROGRAM

(75) Inventor: Shinichiro Maekawa, Kawasaki (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/456,284

(22) Filed: Dec. 8, 1999

(30) Foreign Application Priority Data

Dec. 10, 1998 (JP) .................................................. 10-350807

(51) Int. Cl.[7] .......................... G03G 15/00; B41B 15/00; B41J 15/00; H04N 1/00; H04N 1/40
(52) U.S. Cl. .......................... 399/82; 358/1.13; 358/1.16; 358/296; 358/404; 358/444; 399/85
(58) Field of Search ................................ 399/82, 85, 145, 399/204, 368; 358/296, 302, 300, 404, 406, 444, 1.17, 1.18, 1.13

(56) References Cited

U.S. PATENT DOCUMENTS

| | | | |
|---|---|---|---|
| 4,344,697 | * 8/1982 | Matsumoto et al. | 399/85 |
| 4,712,906 | * 12/1987 | Bothner et al. . | |
| 4,878,123 | * 10/1989 | Miura et al. | 358/404 X |
| 5,068,741 | * 11/1991 | Takahashi | 358/296 |
| 5,296,907 | * 3/1994 | Kawabuchi et al. | 399/82 X |
| 5,678,000 | * 10/1997 | Ohtani . | |
| 5,682,246 | * 10/1997 | Yoshida | 358/296 |
| 5,696,853 | 12/1997 | Kawana et al. | 382/299 |
| 5,760,811 | 6/1998 | Seto et al. | 347/131 |
| 5,818,606 | * 10/1998 | Muramatsu et al. | 399/82 X |
| 5,870,648 | * 2/1999 | Sakaki et al. | 358/300 X |
| 5,940,653 | 8/1999 | Maekawa et al. | 399/9 |

* cited by examiner

Primary Examiner—Susan S. Y. Lee
(74) Attorney, Agent, or Firm—Fitzpatrick, Cella, Harper & Scinto

(57) ABSTRACT

A printing apparatus includes an image forming unit which has an image carrier for holding an image, operates in a first image forming mode to form an image for a single page on the image carrier and in a second image forming mode to form images for a plurality of pages on the image carrier, and performs image formation in one of the first image forming mode and the second image forming mode. The printing apparatus includes a receiving unit for receiving printing data from an external device, a unit for analyzing the printing data to obtain image data and image forming condition information in units of page, and a control unit for selecting one of the first image forming mode and the second image forming mode depending on the image forming condition information, thereby rendering the image formation to be performed in the selected mode. A control method for the printing apparatus and a computer-readable storage medium storing a control program for the printing apparatus are also provided.

30 Claims, 12 Drawing Sheets

FIG. 3
1-PAGE FORMING MODE
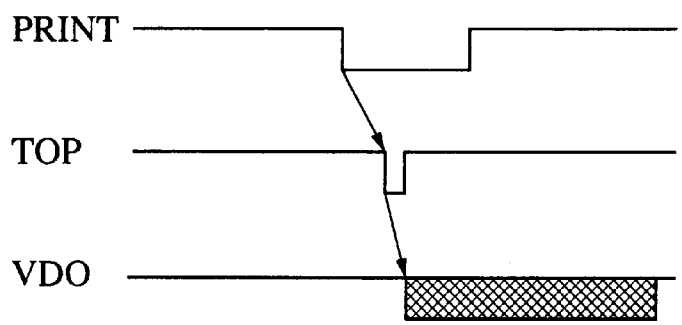
2-PAGE FORMING MODE
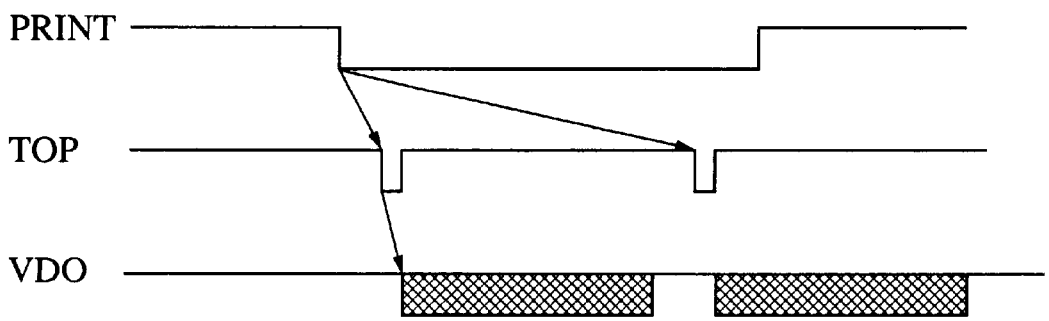

FIG. 4
1-PAGE FORMING MODE
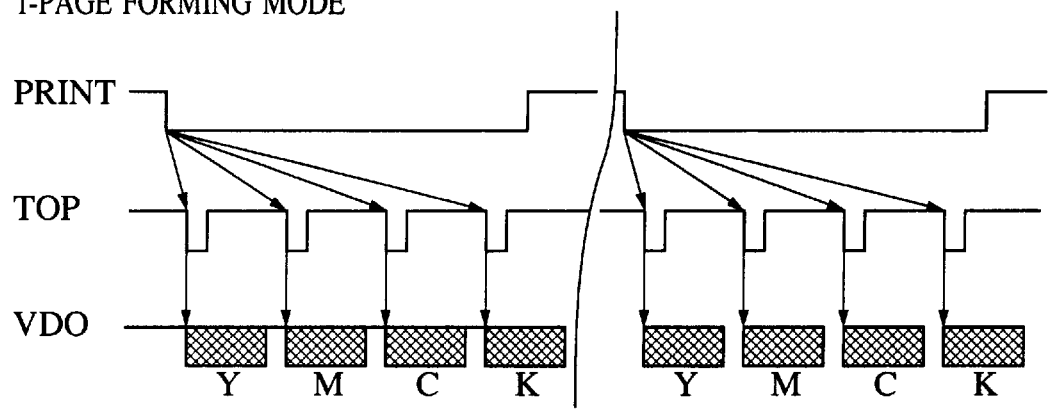
2-PAGE FORMING MODE
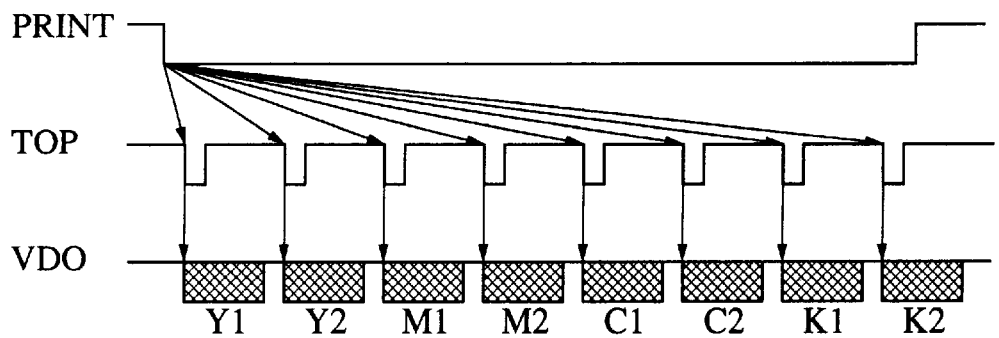

PRINTING APPARATUS, CONTROL METHOD FOR THE SAME, AND COMPUTER-READABLE STORAGE MEDIUM STORING PRINTING-APPARATUS CONTROL PROGRAM

BACKGROUND OF THE INVENTION

1. Field of the Invention

The present invention relates to a printing apparatus which includes an image forming means utilizing, for example, an electrophotographic process, a control method for the printing apparatus, and a computer-readable storage medium storing a control program for the printing apparatus.

2. Description of the Related Art

Page printers, primarily laser beam printers, have developed rapidly in recent years. More recently, a variety of page printers capable of outputting full-color images have also been proposed and commercialized.

In a color laser beam printer, a full-color image is formed by superimposing four images which are formed with the known electrophotographic process using toners of four colors. Various systems have been proposed for carrying out the electrophotographic process in a full-color fashion.

For example, an intermediate transfer system is known wherein a full-color image is formed by developing a latent image on a photoconductive drum into a toner image of each color, transferring each toner image to an intermediate transfer member successively to superimpose four-color toner images on the intermediate transfer member, and then transferring the four-color toner images to a sheet of paper at a time, followed by fusing the transferred images.

With such an intermediate transfer system, as shown in FIG. 11, toner images 1001–1004 of four colors, i.e., C (cyan), M (magenta), Y (yellow) and K (black, also denoted by Bk hereinafter), are successively formed on a photoconductive drum and transferred to an intermediate transfer member 1100 in superimposed relation. Then, the four-color toner images are transferred from the intermediate transfer member 1100 to a sheet of paper 1200. Note that while the photoconductive drum and the intermediate transfer member each having a cylindrical shape are usually employed, image forming surfaces of those components are shown in a developed state in FIG. 11 and FIG. 12 (described later).

The intermediate transfer system is advantageous in that since the positional relationship between the photoconductive drum and the intermediate transfer member is physically fixed, it is easier to avoid displacements of the four-color images than a system of transferring a toner image to a sheet of paper for each color without using the intermediate transfer member.

However, the image forming method based on the intermediate transfer system has such a problem that an intermediate transfer member having dimensions which correspond to a maximum size of sheet of paper available is required, and a throughput of printing is reduced when using sheets of paper smaller than the maximum size.

More specifically, as shown in FIG. 12, assuming that the maximum sheet size supportable by a printer is x×y, an intermediate transfer member also must have the size of x×y. The left side in FIG. 12 represents the case in which an image is transferred from the intermediate transfer member 1100 to the sheet of paper 1200 having the maximum size. When the sheet of paper 1200 used has a size half the maximum one, i.e., (x×y)/2, only a half of the intermediate transfer member 1100 is employed to print one page.

In other words, the problem experienced in the intermediate transfer system is that when an image is formed in units of pages on each sheet of paper having a size smaller than the maximum one, the maximum number of sheets printable per minute cannot be increased over that obtained when printing images on sheets of paper having the maximum size no matter which size of paper is used in printing.

SUMMARY OF THE INVENTION

An object of the present invention is to solve the problems set forth above, and to increase a throughput of the printing process in a printing system utilizing the electrophotographic process when a sheet of paper having a size smaller than the available maximum one is used.

Another object of the present invention is to solve the problem encountered when images for a plurality of pages (frames) are formed on an image carrier.

To achieve the above object, the present invention provides a printing apparatus, a control method for the printing apparatus, and a computer-readable storage medium storing a control program for the printing apparatus, the printing apparatus including an image forming unit which has an image carrier for holding an image, operates in a first image forming mode to form an image for a single page on the image carrier and in a second image forming mode to form images for a plurality of pages on the image carrier, and performs image formation in one of the first image forming mode and the second image forming mode. In the present invention printing data is received from an external device and the printing data is analyzed to obtain image data and image forming condition information in units of page. One of the first image forming mode and the second image forming mode is selected depending on the image forming condition information, thereby rendering the image formation to be performed in the selected mode.

The printing apparatus further includes a storage unit capable of storing the image data and the image forming condition information for a plurality of pages. The image data and the image forming condition information for two or more pages are stored in the storage unit, and one of the first image forming mode and the second image forming mode is selected in accordance with a result of determining whether plural data of the image forming condition information are the same for the two or more pages.

Preferably, the image forming condition information includes at least one of a paper feed unit for use in printing, a transport mode for one-side/both-side printing, a color mode, a paper ejection unit, an image size, a control parameter of an image forming process, a toner density, and resolution.

With the above features, superior advantages are obtained in that a throughput of the printing process can be increased to a maximum, and a printing output with high quality can be achieved.

Other superior advantages are that image forming conditions can be precisely reproduced as designated from an external device without causing undesirable errors, and the formation of images with high quality can be achieved.

Further, since the printing in the second image forming mode is allowed to run only when the various image forming conditions are matched, this ensures the superior advantages that the image forming conditions can be precisely reproduced as designated from an external device without causing undesirable errors, and the formation of images with high quality can be achieved.

Thus, according to the present invention, it is possible to increase a throughput of the printing process to a maximum, and achieve high quality of a printing output and speed-up of a printing process in the printing apparatus at the same time.

Other objects, features and advantages of the present invention will become more apparent from reading the following description with reference to the drawings.

BRIEF DESCRIPTION OF THE DRAWINGS

FIG. 3 is an explanatory chart showing a signal interface in the monochromatic printing mode between the printer engine and a controller in the laser beam printer embodying the present invention;

FIG. 4 is an explanatory chart showing a signal interface in the color printing mode between the printer engine and the controller in the laser beam printer embodying the present invention;

DESCRIPTION OF THE PREFERRED EMBODIMENT

A preferred embodiment of the present invention will be described below in detail with reference to the accompanying drawings.

Figure 1:
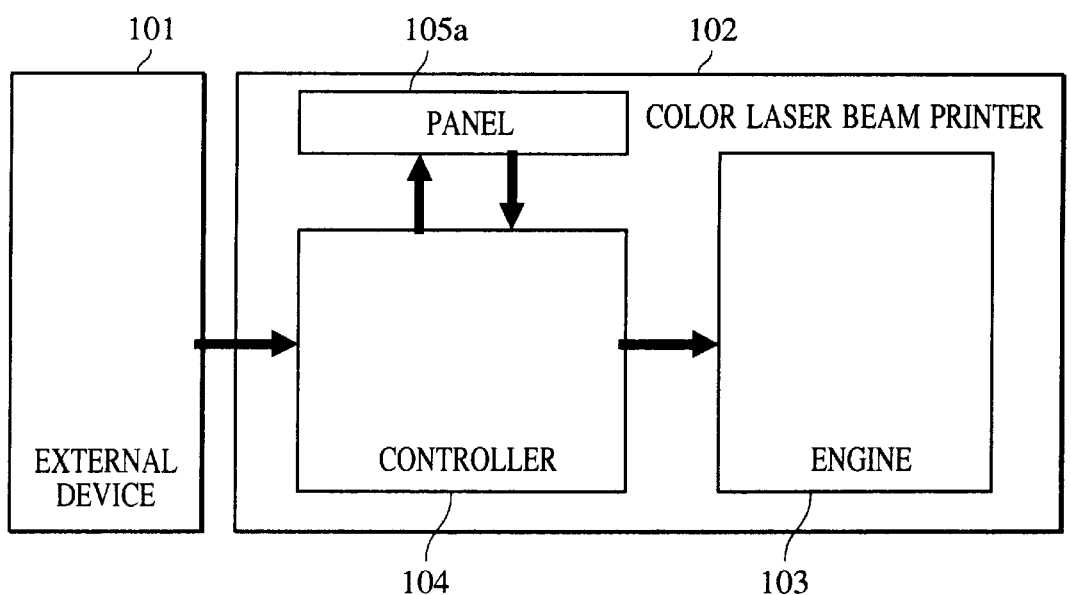
FIG. 1 is a block diagram showing the configuration of an entire system including a laser beam printer embodying the present invention.

FIG. 1 shows the configuration of an entire system including a color laser beam printer of this embodiment. Referring to FIG. 1, numeral 101 denotes an external device such as a host computer, and 102 denotes a color laser beam printer of this embodiment.

The color laser beam printer 102 includes an engine 103 in which a full-color image is printed by actually forming latent images on a photoconductive drum based on dot data for each of four colors, i.e., Y, M, C and Bk, forming four-color toner images of Y, M, C and Bk in superimposed relation and transferring them to a sheet of paper, and fusing the transferred images. A hardware structure of the engine 103 will be described later.

Printing operation of the engine 103 is controlled by a controller 104 which receives code data and image data (RGB, YMCK) both transmitted from the external device 101, produces page information made up of dot data for each color of Y, M, C and Bk based on the received data, and transmits the dot data successively to the engine 103.

The color laser beam printer 102 shown in FIG. 1 also includes a panel 105a comprising a display, control keys, etc. An operator (user) can designate the operation of the color laser beam printer 102 by actuating the control keys, etc. on the panel 105a.

The controller 104 and the engine 103 are connected to each other via a predetermined video interface for exchange of information through command/status serial communication in units of 8 bits. Also, communication between the external device 101 and the color laser beam printer 102 is performed via a network interface such as a bidirectional parallel port, serial port or Ethernet.

Figure 2:
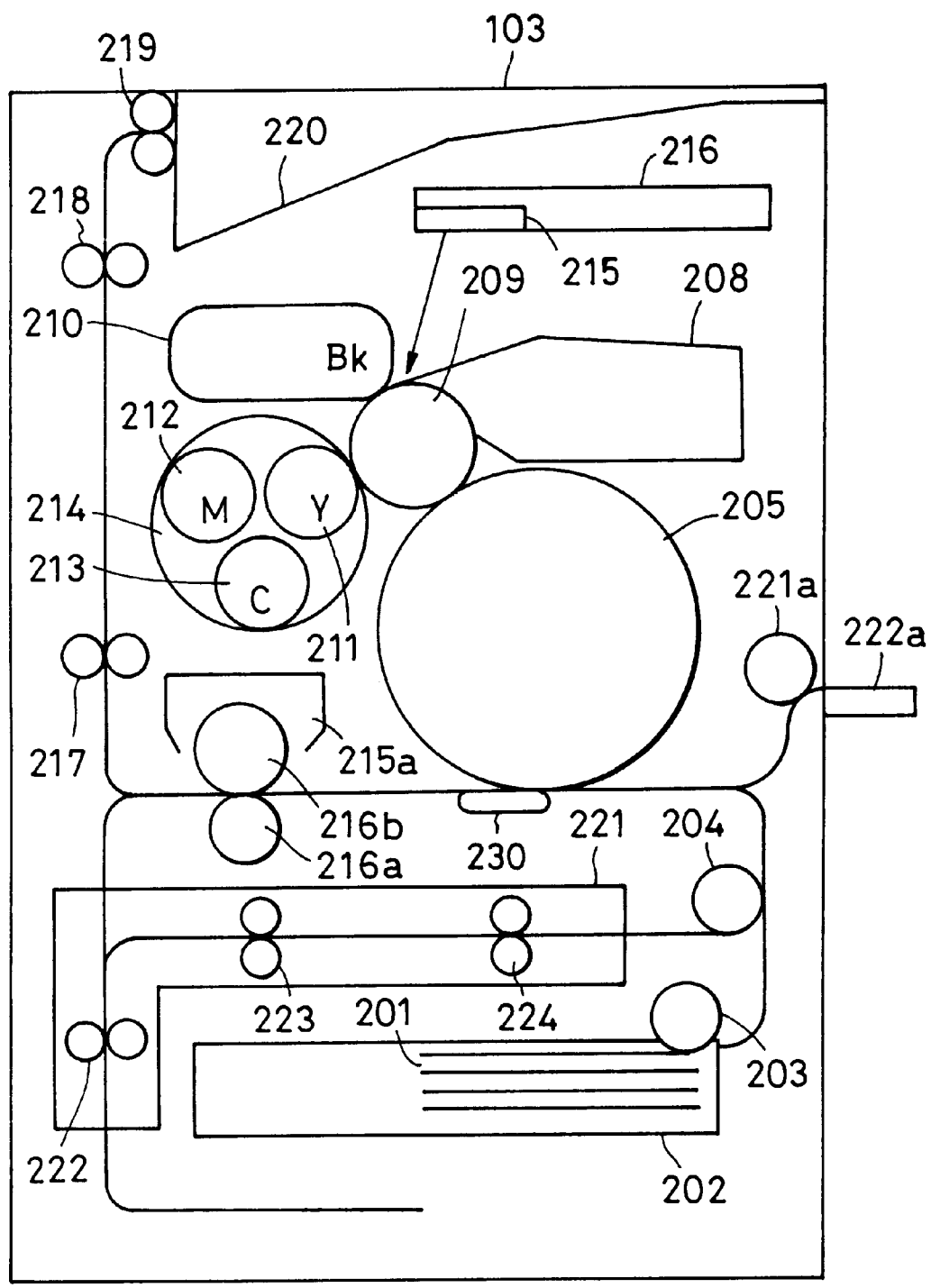
FIG. 2 is an explanatory view showing the construction of a printer engine in the laser beam printer embodying the present invention.

FIG. 2 shows the construction of the engine 103 in the laser beam printer of this embodiment.

Referring to FIG. 2, numeral 201 denotes a sheet of paper serving as a recording medium, and 202 denotes a paper cassette for holding sheets of paper 201. Numeral 203 denotes a clutch for cassette paper feed in the form of a cam which acts to separate only the uppermost one of the sheets of paper 201 stacked on the paper cassette 202 and then advances the leading end of the separated sheet to the position of a paper feed roller 204 by a driving means (not shown). The cam is rotated intermittently for each paper feed cycle so that one sheet of paper is fed with one rotation of the cam.

When a sheet of paper 201 is advanced to the position of the paper feed roller 204 by the paper feed clutch 203, the paper feed roller 204 rotates while slightly pressing the sheet of paper 201, thereby further advancing it. Numeral 222a denotes a paper rest, and 221a denotes a clutch for manual paper feed. Thus, sheets of paper can also be manually fed one by one for printing from the paper rest 222a instead of automatic paper feed from the paper cassette 202.

Numeral 209 denotes a photoconductive drum, and 208 denotes a drum cartridge including the photoconductive drum 209. Numeral 210 denotes a black-toner (Bk) developing unit, 211 denotes a yellow-toner (Y) developing unit, 212 denotes a magenta-toner (M) developing unit, 213 denotes a cyan-toner (C) developing unit, and 214 denotes a support for the Y, M and C developing units. The black-toner developing unit 210 and the developing unit support 214 are disposed in contact relation to the photoconductive drum 209, and are rotated by a driving means (not shown) so that any one of the Bk, Y, M and C developing units can be located at a development position facing the photoconductive drum 209.

Numeral 216 denotes a scanner unit including a laser driver 215. The laser driver 215 focuses an optical image on the photoconductive drum 209 while turning on/off a semiconductor laser (not shown) in accordance with the dot data transmitted from the printer controller 104, and scans the focused image in the direction of main scan to form a latent image on a main scan line.

Numeral 205 denotes an intermediate transfer drum. The intermediate transfer drum 205 is rotated at a predetermined speed during a printing process. The intermediate transfer drum 205 is constructed of an electrically chargeable body as with the photoconductive drum 209. A toner image formed on the photoconductive drum 209 is transferred to the intermediate transfer drum 205 using a charger or the like (not shown). In the case of full-color printing, toner images of the respective colors are superimposed on the intermediate transfer drum 205.

More specifically, parallel to formation of a latent image performed with the photoconductive drum 209 being subjected to a laser beam, development of the latent image to a visible toner image of a corresponding color is performed by one of the developing units 210, 211, 212 and 213 containing the toner of the corresponding color. Further, parallel to the above process, the toner image is transferred to the rotating intermediate transfer drum 205. As a result, the toner image having a size matched with one page is formed on the intermediate transfer drum 205. In the monochromatic mode, a 1-page toner image of one color (the 1-page toner image being also referred to as a plane hereinafter) is formed on the intermediate transfer drum 205. In the full-color mode, four planes formed by the developing units 210, 211, 212 and 213 are superimposed one above another on the intermediate transfer drum 205.

Numeral 230 denotes a secondary transfer roller. The secondary transfer roller 230 is charged with electricity in a condition that the sheet of paper 201 is positioned between the intermediate transfer drum 205 and the secondary transfer roller 230, for thereby transferring the toner images on the intermediate transfer drum 205 to the sheet of paper 201 (secondary transfer).

Numeral 215a denotes a fusing heater for fixing the toner image on the sheet of paper 201 under heating, and 216a, 216b denote fusing rollers. After being subjected to the secondary transfer, the sheet of paper 201 is further advanced to the fusing rollers 216a, 216b where the toner image is fixed under heating. The sheet of paper 201 is then ejected onto a paper ejection tray 220 via transport rollers 217, 218 and 219.

In the color laser beam printer 102 of this embodiment, the process of forming the latent image and transferring the toner image is performed in the order of yellow, magenta, cyan and black. The yellow-toner developing unit 211, the magenta-toner developing unit 212, the cyan-toner developing unit 213, and the black-toner developing unit 210 are each formed of a cassette type housing and are attached to a printer body in a detachable manner. For this reason, those developing units 210, 211, 212 and 213 are also called respectively a Y cartridge, an M cartridge, a C cartridge and a K cartridge.

Numeral 221 denotes a paper reversing/re-feeding unit and comprises transport rollers 222, 223 and 224. The paper reversing/re-feeding unit 221 is mainly used in, e.g., both side printing to turn over the sheet of paper having an image printed on one side thereof, and to supply it to the printer engine again in a reversed state. The engine 103 can select one of the paper ejection tray 220 and the paper reversing/re-feeding unit 221 as a target to which the sheet of paper 201 is transported after being subjected to the fusing. Which one is to be selected is instructed from the controller 104 via serial communication. When transport to the paper reversing/re-feeding unit 221 is instructed, the sheet of paper 201 enters the paper reversing/re-feeding unit 221 and is once advanced toward the transport roller 222. Then, when the tailing end of the sheet of paper 201 is detected by a sensor (not shown), the engine 103 rotates the transport roller 222 backward for advancing the sheet of paper 201 to the transport rollers 223 and 224. In this way, when the paper reversing/re-feeding unit 221 is designated as a paper inlet, the sheet of paper 201 is transported to the paper feed roller 204 in the reversed state, and both-side printing can be performed on the sheet of paper 201 through the above-described printing process.

Thus, the engine 103 in this embodiment is able to selectively carry out the full-color printing and the monochromatic printing by forming a 1-page toner image on the intermediate transfer drum 205.

As with the related art described above, an outer circumferential length of the intermediate transfer drum 205 is also set in this embodiment to a value greater than the longer side of a sheet of paper having a printable maximum size.

For the purpose of reducing feed intervals of sheets of paper and increasing a throughput of the printing process, this embodiment provides a mode which is used for sheets of paper having a length not smaller than half the maximum sheet length, and in which toner images for two pages are formed on the intermediate transfer drum 205 and the two pages are continuously printed by feeding two sheets of paper in quick succession. Hereinbelow, the continuous printing of two pages will be referred to as a 2-page forming mode, and the normal printing will be referred to as a 1-page forming mode (or a normal printing mode). While the maximum sheet size supportable by the printer engine can be optionally set, it is assumed in this embodiment that the maximum sheet size is set to be not smaller than twice an A4-size sheet in landscape feed (corresponding to A4-size sheet in portrait feed), and the intermediate transfer drum 205 also has a corresponding size. Thus, in A4-sheet landscape feed, the continuous printing can be made on two pages of A4 sheets.

FIGS. 3 and 4 are timing charts of interface signals showing a printing protocol between the printer engine 103 and the controller 104 in the color laser beam printer of this embodiment.

Referring to FIGS. 3 and 4, PRINT denotes a signal issued from the controller 104 for requesting to start printing, TOP denotes a timing signal issued from the engine 103 for requesting the controller 104 to transmit image data (video signal), and VDO denotes image data transmitted from the controller 104 on the page-by-page basis in synch with a clock signal (not shown). Upon detecting the PRINT signal at a TRUE level, the engine 103 starts the printing operation and issues, to the controller 104, the TOP signal held at a TRUE level for a predetermined period. Upon detecting the TOP signal at the TRUE level, the controller 104 transmits the VDO signal for one page in synch with the detection. The engine 103 forms an image according to the VDO signal.

Specifically, the timing chart of FIG. 3 represents the monochromatic mode and the timing chart of FIG. 4 represents the full-color mode.

Referring to FIG. 3, in the 1-page forming mode, the engine 103 issues one TOP signal in response to the PRINT signal from the controller 104. In the 2-page forming mode, the engine 103 issues two TOP signals in response to the PRINT signal from the controller 104. After the engine 103 has been prepared for printing two pages, the controller 104 sets the PRINT signal to the TRUE level and transmits image data for a first page in synch with the first TOP signal and then image data for a second page in synch with the second TOP signal.

Referring to FIG. 4, in the 1-page forming mode, the engine 103 issues four TOP signals for four colors, i.e., yellow, magenta, cyan and black, in response to the PRINT signal from the controller 104. In the 2-page forming mode, the engine 103 issues total eight TOP signals Y1 (first page for yellow), Y2 (second page for yellow), M1, M2, C1, C2, K1 and K2 in response to the PRINT signal from the controller 104. After the engine 103 has been prepared for printing two pages, the controller 104 sets the PRINT signal to the TRUE level and transmits yellow image data for a first page in synch with the first TOP signal and yellow image data for a second page in synch with the second TOP signal, followed by similarly transmitting magenta image data for the first page, magenta image data for the second page, cyan image data for the first page, cyan image data for the second page, black image data for the first page, and black image data for the second page in synch with the respective TOP signals.

An instruction for changing the mode from the 1-page forming mode to the 2-page forming mode or vice versa is sent from the controller 104 to the engine 103 via serial communication.

Figure 5:
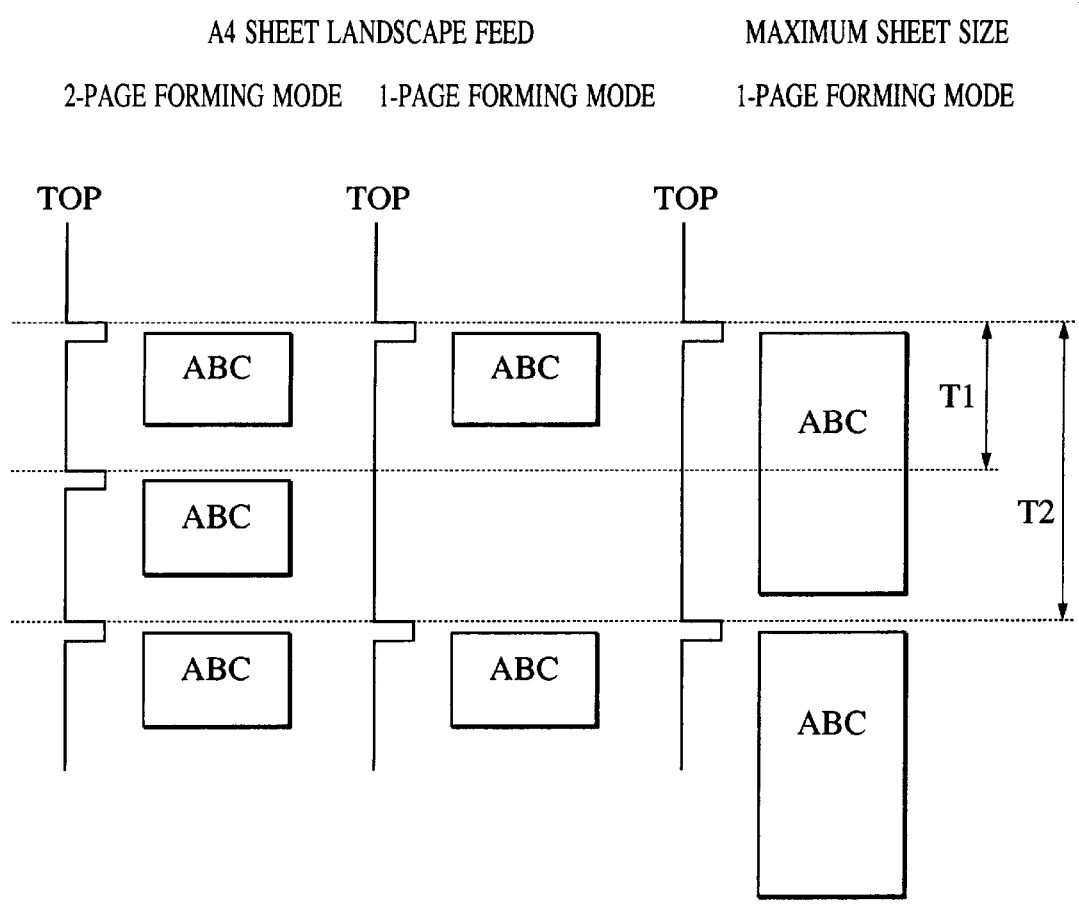
FIG. 5 is an explanatory view for explaining an advantage of the laser beam printer embodying the present invention.

FIG. 5 is an illustration for explaining an advantage of increasing a throughput by the use of the 2-page forming mode in this embodiment. Referring to FIG. 5, TOP denotes the TOP signal explained above in connection with FIGS. 3 and 4. Also, in FIG. 5, the left side represents the 2-page forming mode, while the center and the right side represent the 1-page forming mode. Particularly, a right side represents the 1-page forming mode in the case of feeding sheets of paper having the maximum sheet size. Further, symbol T1 denotes an interval for image formation in the 2-page forming mode (the left side of FIG. 5), and T2 denotes an interval for image formation in the 1-page forming mode (the center and the right side of FIG. 5).

In the 1-page forming mode, as shown, the timing interval at which the TOP signal is issued is the same T2 in both the case of feeding A4-sheets in the landscape state and the case of feeding sheets of paper having the maximum size. Accordingly, the same maximum throughput is provided in terms of the number of sheets printed per minute no matter which size of sheet is employed. This is the problem described above in connection with the related art.

On the other hand, by employing the 2-page forming mode in this embodiment, the interval of issuing the TOP signals is reduced to T1 that is half of T2 as shown in the left side of FIG. 5, and therefore the number of sheets printed per minute is doubled.

The 2-page forming mode is hence very effective in increasing a throughput of the printing process employing the intermediate transfer drum 205. In the 2-page forming mode, however, because images are formed through the successive printing processes, it is very difficult to reflect the setting designated from the controller 104 on the subsequent printing process via serial communication or the like made between two pages. Also, if the designated setting affects parameters of the printing process, it becomes more difficult to reflect such type setting from restrictions in the printing process, mechanical structure and time. For example, if image forming conditions of two pages to be formed in succession are quite different from each other, serious difficulties are encountered in reflecting those image forming conditions respectively on the two pages in a proper way.

In this embodiment, therefore, when the 2-page forming mode is not adapted because of, e.g., different image forming conditions of two pages to be formed in succession even if sheets of paper used have a size printable in the 2-page forming mode, the controller 104 performs control to prohibit run of the 2-page forming mode.

Figure 6:
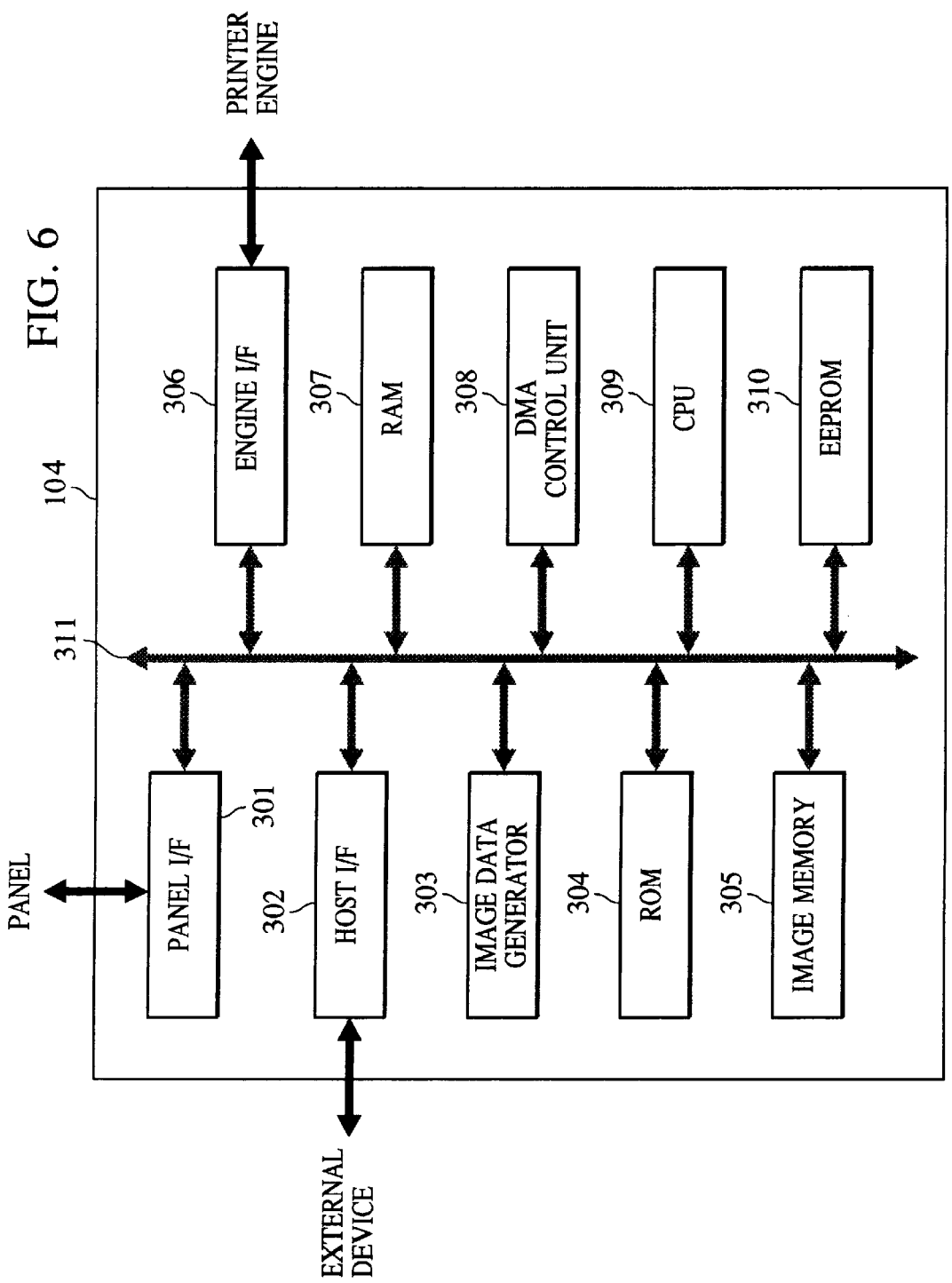
FIG. 6 is a block diagram showing the configuration of a control circuit of the controller in the laser beam printer embodying the present invention.

FIG. 6 is a block diagram of the controller 104 in this embodiment.

Referring to FIG. 6, numeral 301 denotes a panel interface (I/F) for receiving various settings and instructions, which are entered by the operator, from the panel 105a via data communication with the panel 105a, and 302 denotes a host interface (I/F) through which signals are inputted from and outputted to the external device 101 such as a host computer. The host interface 302 comprises, as described above, a network interface such as a bidirectional parallel port, serial port or Ethernet.

Numeral 306 denotes an engine interface (I/F) through which signals are inputted from and outputted to the printer engine 103. The engine interface 306 transmits data signals from an output buffer register (not shown) and executes control for communication with the printer engine 103.

Numeral 303 denotes an image data generator for generating bit map data used for actual printing based on control code data transmitted from the external device 101. Numeral 305 denotes an image memory for storing the image data, 309 denotes a CPU for supervising entire control of the printer controller 104, and 307 denotes a RAM used by the CPU for temporarily storing data. Also, numeral 310 denotes an EEPROM serving as a nonvolatile memory means. Numeral 308 denotes a DMA control unit for transferring the bit map data in the image memory to the engine interface 306 in accordance with an instruction from the CPU 309.

Numeral 311 denotes a system bus including an address bus and a data bus. Each of the panel interface 301, the host interface 302, the image data generator 303, the ROM 304, the image memory 305, the engine interface 306, the RAM 307, the DMA control unit 308, the CPU 309, and the EEPROM 310 is connected to the system bus 311 and can access to all the functional components connected to the system bus 311.

A control code for controlling the CPU 309 is made up of an OS for executing time-sharing control in units of load module (called also a task) in accordance with a system clock (not shown), and a plurality of load modules (tasks) operating on the function by function basis.

Figure 7:
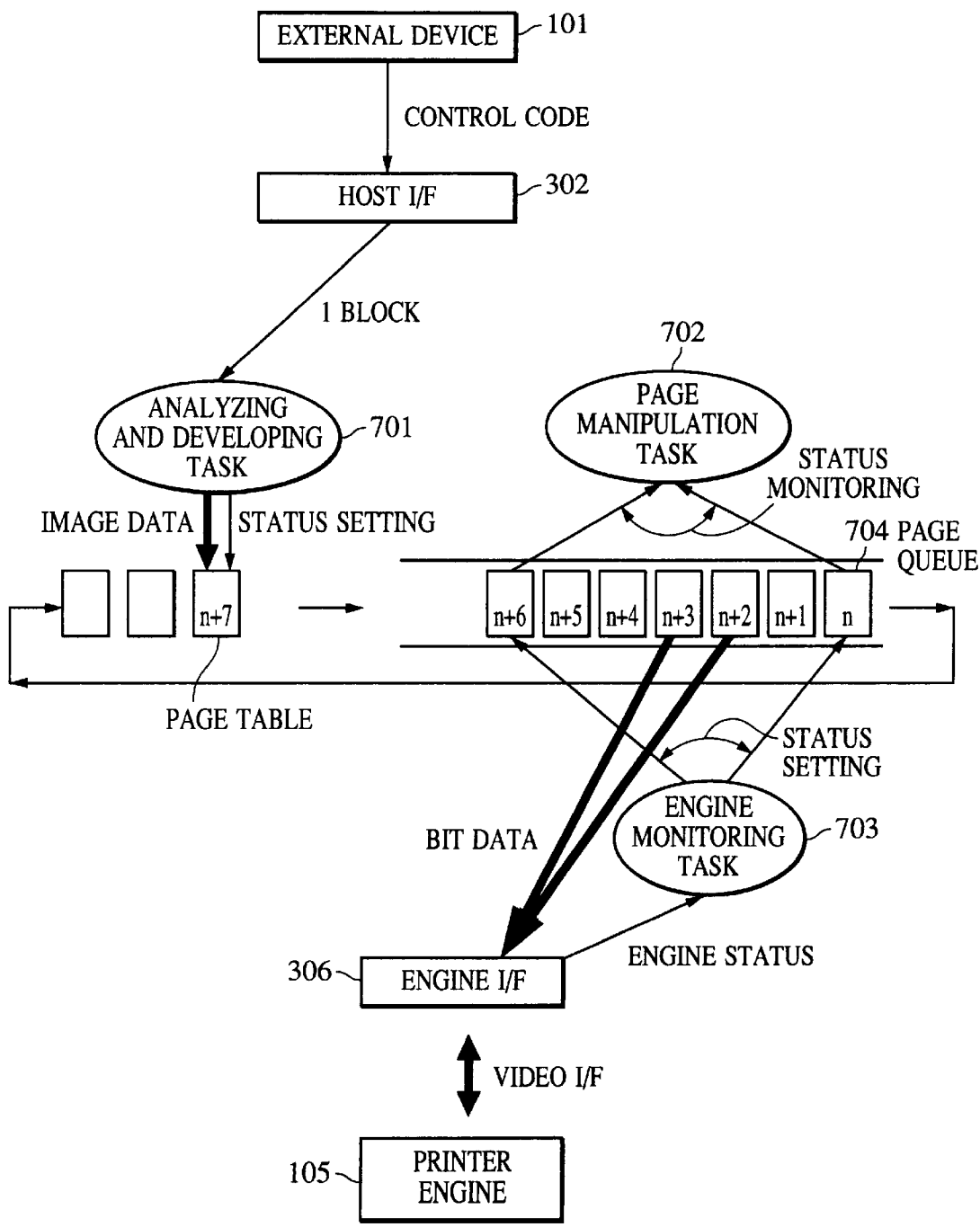
FIG. 7 is an explanatory view showing a data flow in the laser beam printer embodying the present invention.

FIG. 7 shows a data flow in the color laser beam printer of this embodiment. In FIG. 7, an analyzing and developing task 701, a page manipulation task 702, and an engine monitoring task 703 are examples of the above-mentioned tasks executed by the CPU 304, and are assumed to operate in parallel logically.

Referring to FIG. 7, upon receiving one block of data via the host interface 302, the analyzing and developing task 701 executes font development, etc. to produce page data (n, n+1, . . . ), i.e., image data in units of page. These page data (n, n+1, . . . ) are loaded in a page queue 704. The page queue 704 is contained in the form of, e.g., a circulating buffer using control data areas of the image memory 305 and the RAM 307, and is managed by the page manipulation task 702. Corresponding to the 1-page forming mode or the 2-page forming mode, a bit data portion of each page data is transferred to the engine interface 306 under control of the engine monitoring task 703, and is then printed in the printer engine 103. The process of each task in FIG. 7 will be described later in detail.

More specifically, the page data is managed in the form of data structure described below.

Figure 8:
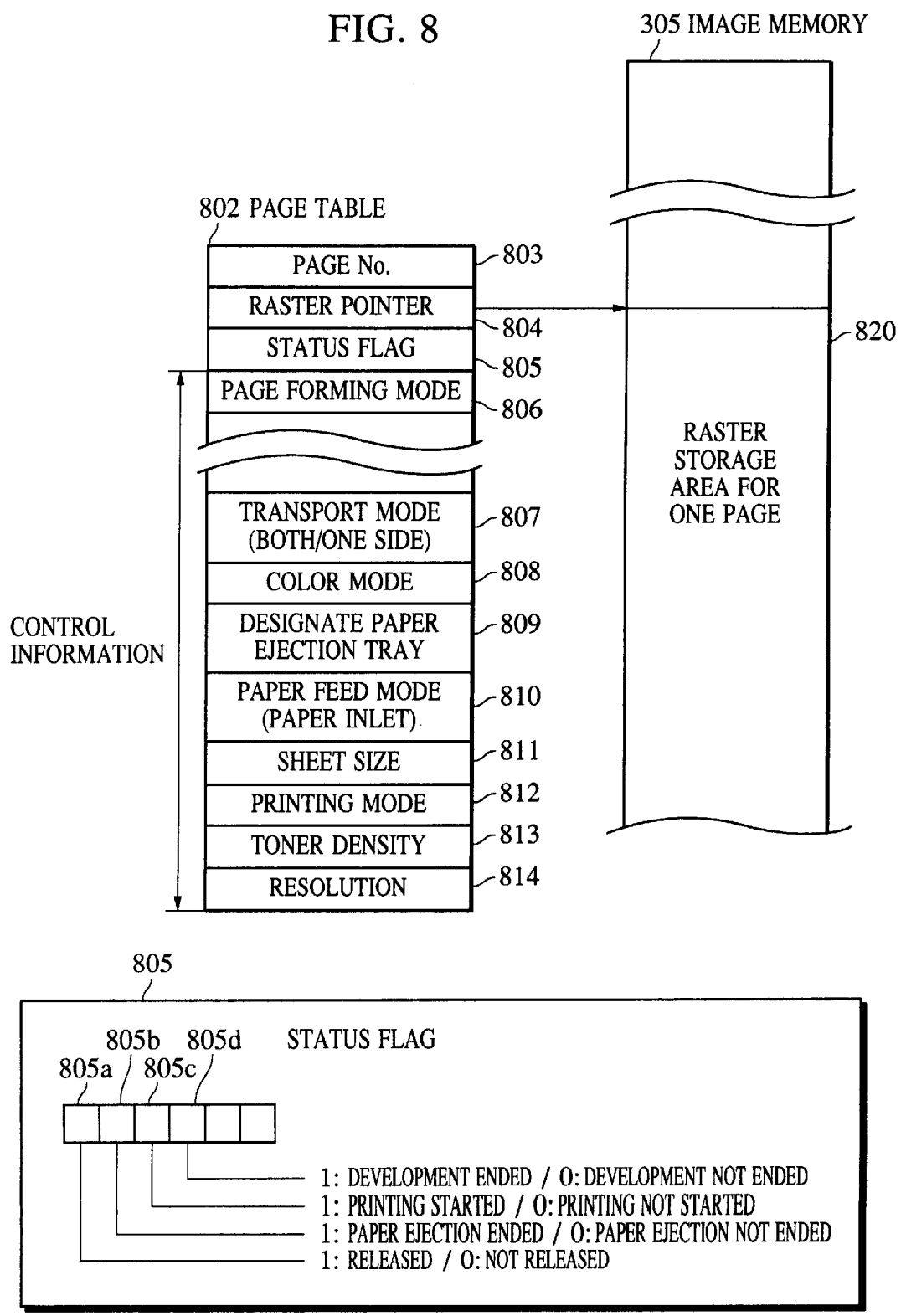
FIG. 8 is an explanatory view showing a data structure used for management of page data in the laser beam printer embodying the present invention.

FIG. 8 shows a data structure of a page table 802, shown in FIG. 7, used for management of the page data. The page table 802 is a table which is used by the CPU 309 for logically recognizing each page and is physically allocated as a continuous area in a control information storage area (not shown) prepared in the RAM 307. The page table 802 is managed to be acquired or released by a page management function unit (not shown).

The page table 802 is identified by a page number 803 locating in its head field. The page number 803 may be independent of the actual page number under job, and is a number internally used for enabling each page table to be uniquely identified.

A raster pointer 804 in the page table 802 is a head pointer of a raster area 820 for one page prepared in the image memory 305. At initialization upon power-on, the CPU 309 divides an associated area (not shown) in the image memory 305 for each page, and then links one of the divided pages to the raster pointer 804.

A status flag 805 is given as an area for storing a flag which indicates a printing process status of the relevant page, and is made up of a release flag 805*a*, a paper ejection end flag 805*b*, a printing start flag 805*c*, and a development end flag 805*d* as shown in a lower part of FIG. 8.

Further, a page forming mode 806 in the page table 802 is given by a flag indicating the image forming mode of the relevant page, and can take one of three values representing "1-page forming mode", "first page in 2-page forming mode", and "second page in 2-page forming mode".

In addition, the page table 802 has fields (807–814) for storing other various control parameters (flags) described below.

A transport mode 807 can take one of two values representing "both-side printing mode" (using the paper reversing/re-feeding unit 221) and "one-side printing mode".

A color mode 808 can take one of two values representing "monochromatic mode" and "full-color mode".

A paper ejection mode 809 can take one of two values representing "paper ejection to the paper ejection tray" and "another not-shown paper ejection tray".

A paper feed mode 810 can take one of three values representing "paper feed from the paper cassette 202", "paper feed from the paper rest 222", and "selection of paper inlet fit for the sheet size".

A sheet size 811 can take one of values stored to represent sizes of images to be formed, which include regular sizes (such as A3 and A4) and non-regular sizes.

A printing mode 812 can take one of values selected to set a mode in which printing is performed in the engine 103 with control parameters, such as the transfer voltage and the transport speed in the fusing step, made optimum depending on the medium type. The printing mode 812 includes "thick paper mode", "OHP mode", etc.

A value stored as a toner density 813 affects the density of a toner image formed in the engine 103. A low value of the toner density 813 provides an advantage of saving the amount of toner used.

A resolution 814 represents the resolution of an image to be formed. It is required that values of the resolution 814 recognized by both the engine 103 and the controller 104 are the same.

Of the image forming conditions decided by the flags (control parameters) shown in FIG. 8, at least the following parameters, i.e., the transport mode (whether or not to reverse the sheet of paper and feed it again) 807, the paper feed mode (selection of the paper inlet) 810, the color mode 808, the paper ejection mode 809, the sheet size 811, the printing mode 812, the toner density 813, and the resolution 814, cannot be designated (or changed) by the engine 103 in this embodiment during a period between the first page and the second page in the 2-page forming mode.

The data flow shown in FIG. 7 will be described below. The printing data (such as the control code and PDL) inputted from the external device 101 is stored in the host interface 302 in units of predetermined number of blocks.

Upon detecting the data in the host interface 302, the analyzing and developing task 701 acquires a page table, and then analyzes the printing data for each block. Image forming information (such as figure drawing commands based on PDL and a character code) is developed into an image by using the image data generator 303 (not shown in FIG. 7) or by the CPU 309 itself, and is stored in the area indicated by the "raster pointer" flag in the page table. Also, control information (such as the number of sheets copied and paper inlet selection) for the printer is stored in the page table. After the data for one page is completely analyzed and developed into the image, the "development end" flag is set to a TRUE level, causing that data to be queued or loaded in the page queue having a FIFO structure.

The page manipulation task 702 simultaneously monitors the "status" flags of all the pages stored in the page queue, and changes the paper feed procedure depending on the monitored status for execution of the printing. The page table in which the "paper ejection" flag has shifted to a TRUE level is unqueued or unloaded from the page queue and is returned to the page management function unit.

The engine monitoring task 703 communicates with the printer engine 103 via the engine interface 306 at a predetermined cycle. When there occurs a change in any factor related to the page status, the engine monitoring task 703 updates the corresponding "status" flag.

Figure 9:
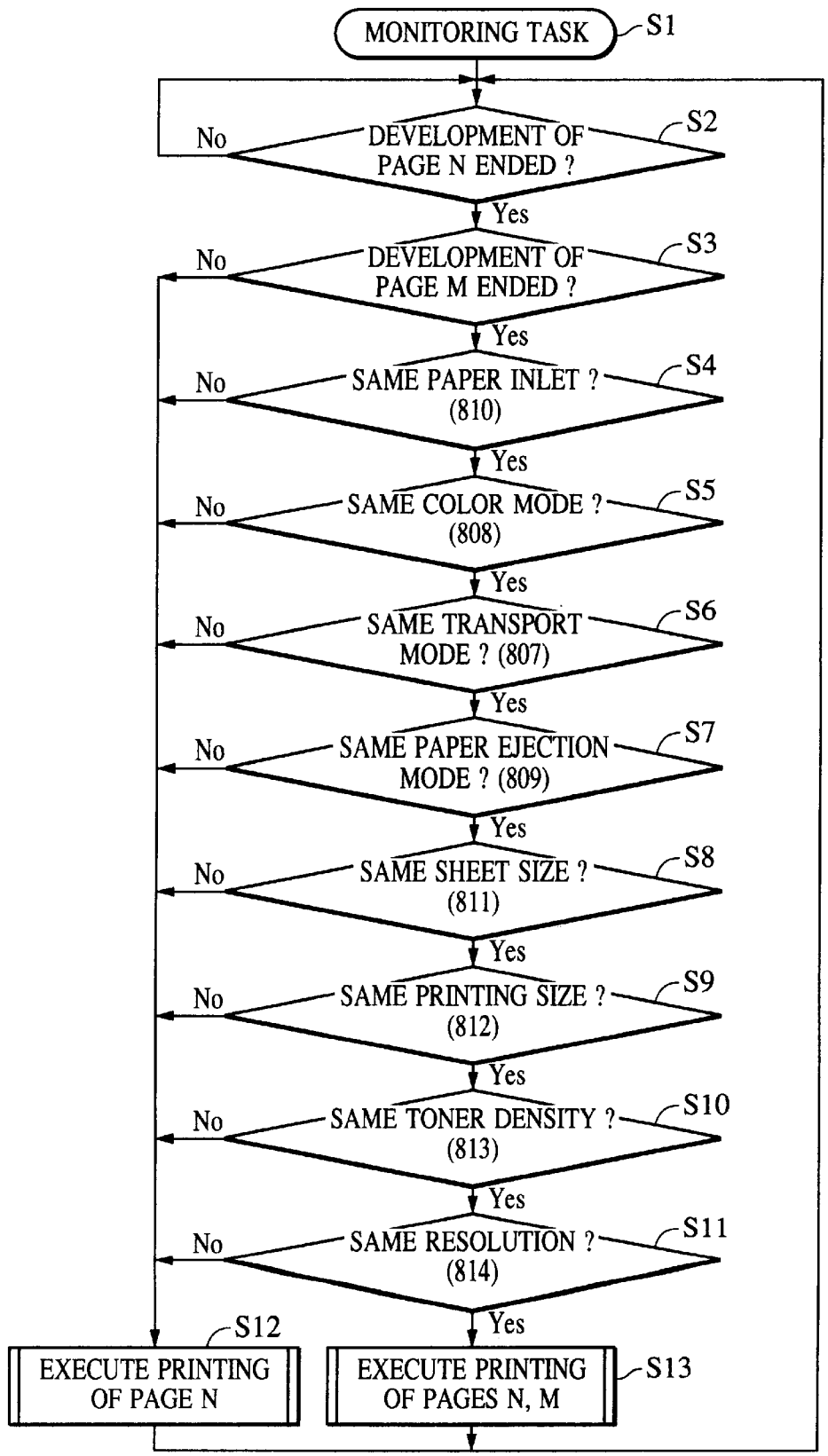
FIG. 9 is a flowchart showing a sequence of printing control procedures in the laser beam printer embodying the present invention.

FIG. 9 is a flowchart showing a sequence of the page manipulation task 702 in this embodiment. The procedures shown in FIG. 9 are executed by the CPU 309.

When the page manipulation task 702 is started up upon power-on (step S1), the page queue is monitored at the predetermined cycle. If the presence of a page N having the status of "development end flag=ON" and "printing start flag=OFF" is detected in the page queue (step S2), the task 702 determines the presence of a next page M and the "development end" flag (step S3). If the presence of the page M is detected and a possibility of the 2-page forming mode between the pages N and M is recognized, the setting statuses (image forming conditions) of various control information for the pages N and M are compared with each other. In other words, it is checked whether the setting statuses of various control information for the pages N and M both in a condition of being able to start the printing are the same. More specifically, the states of the various flags shown in FIG. 8 are compared between the pages N and M as follows.

It is first successively checked whether the paper inlet (paper feed mode) 810 is the same (step S4), whether the color mode 808 is the same (step S5), whether the transport mode 807 is the same (step S6), and whether the paper ejection mode 809 is the same (step S7).

It is then checked whether the sheet size 811 is the same (step S8). This step S8 confirms whether the pages N and M each have a size not greater than ½ of the maximum sheet size (instead of the step S8, the page size may be confirmed in another step provided immediately after the step S3).

Further, the comparison is continued to check whether the printing mode 812, e.g., the "thick paper mode" or the "OHP mode", is the same (step S9), whether the toner density 813 is the same (step S10), and then whether the resolution 814 is the same (step S11). If the states of all the flags are the same, a printing routine for printing the pages N and M in the 2-page forming mode is executed (step S13).

If it is determined as any result of comparisons made in the steps S4, S5, S6, S7, S8, S9, S10 and S11 that the setting statuses of various control information for the pages N and M are different from each other, a printing routine for printing the page N in the 1-page forming mode is executed (step S12).

Figure 10:
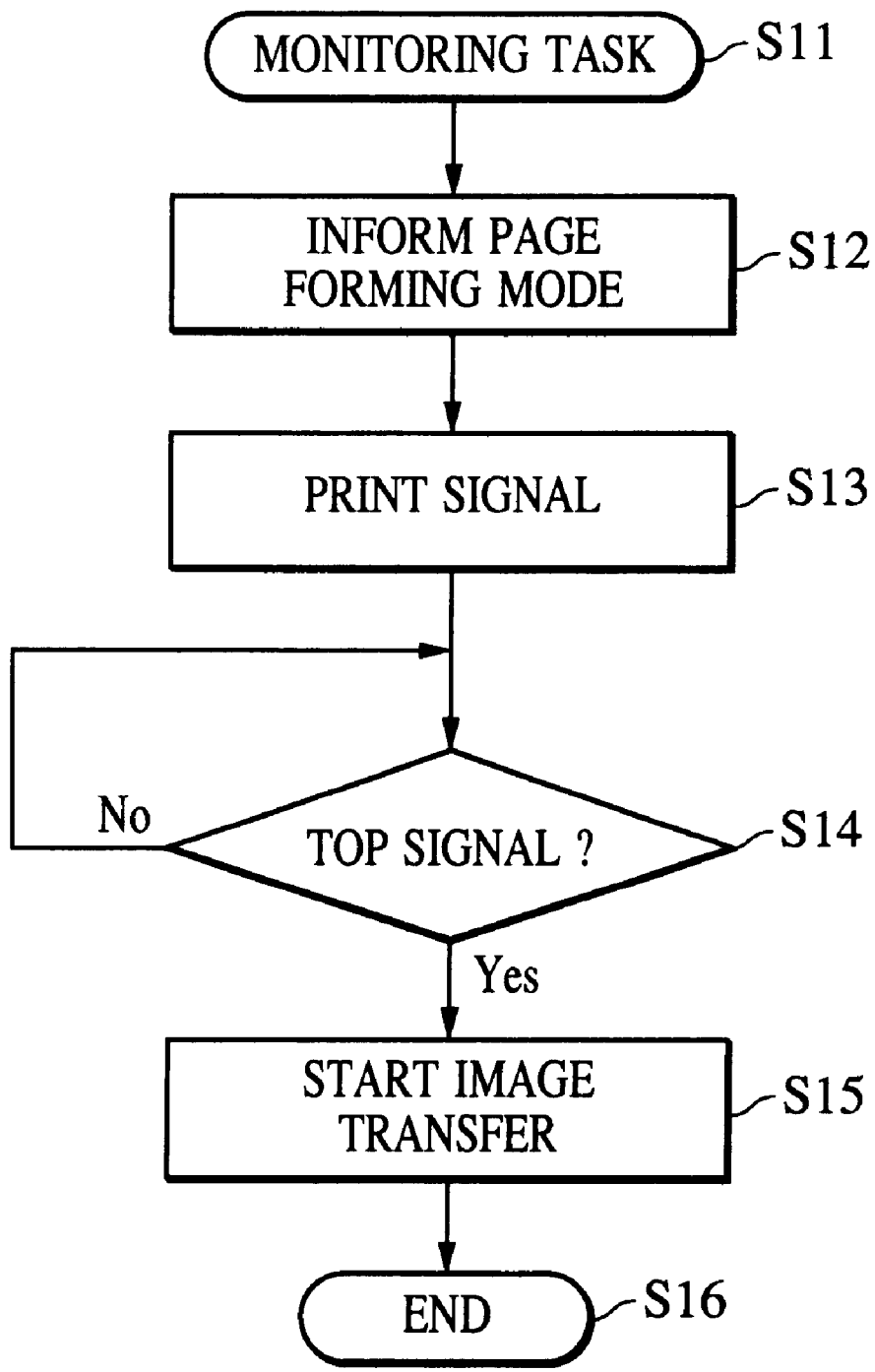
FIG. 10 is a flowchart showing a sequence of printing control procedures in the laser beam printer embodying the present invention.
Figure 11:
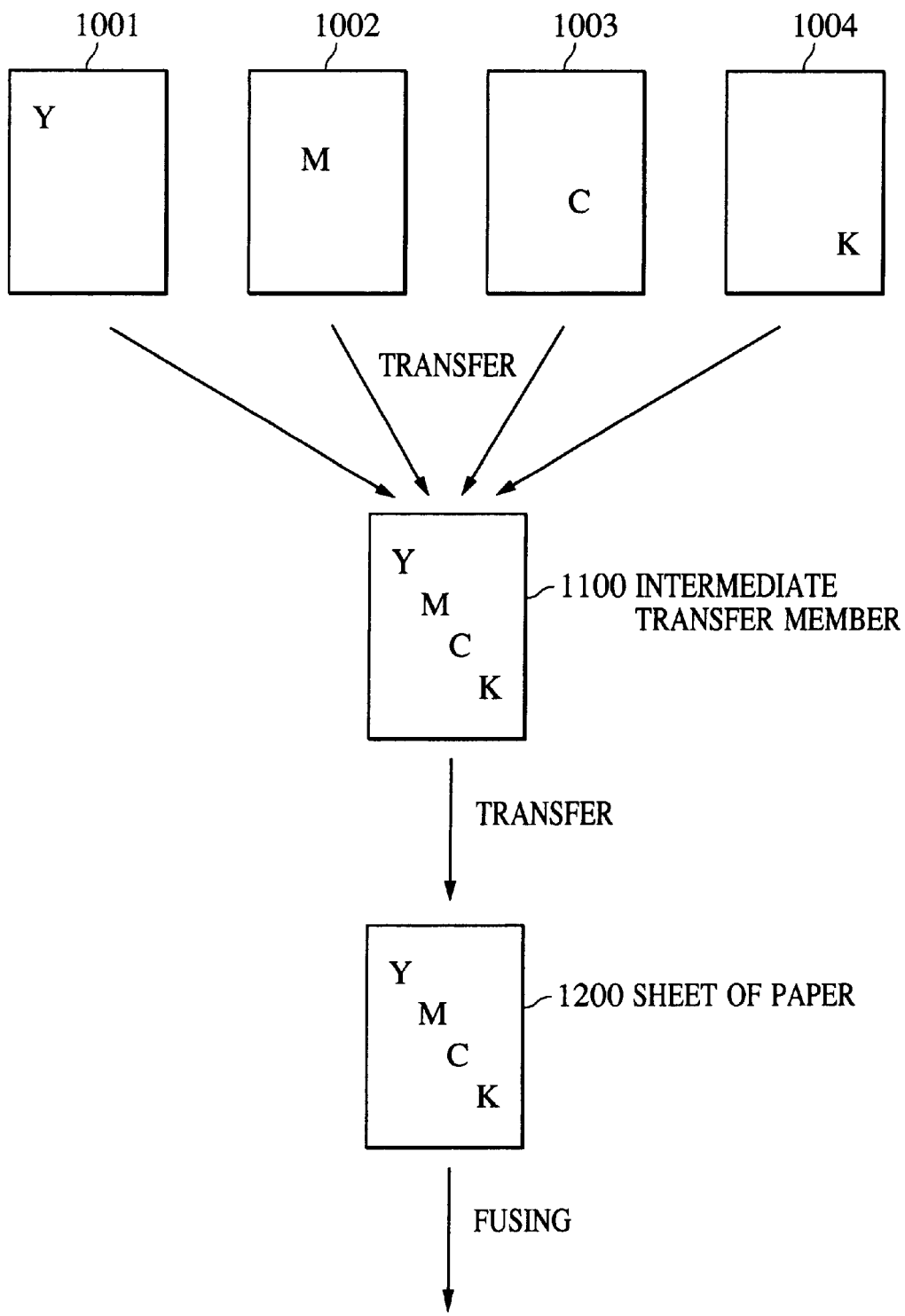
FIG. 11 is an explanatory view schematically showing a printing system using an intermediate transfer member.
Figure 12:
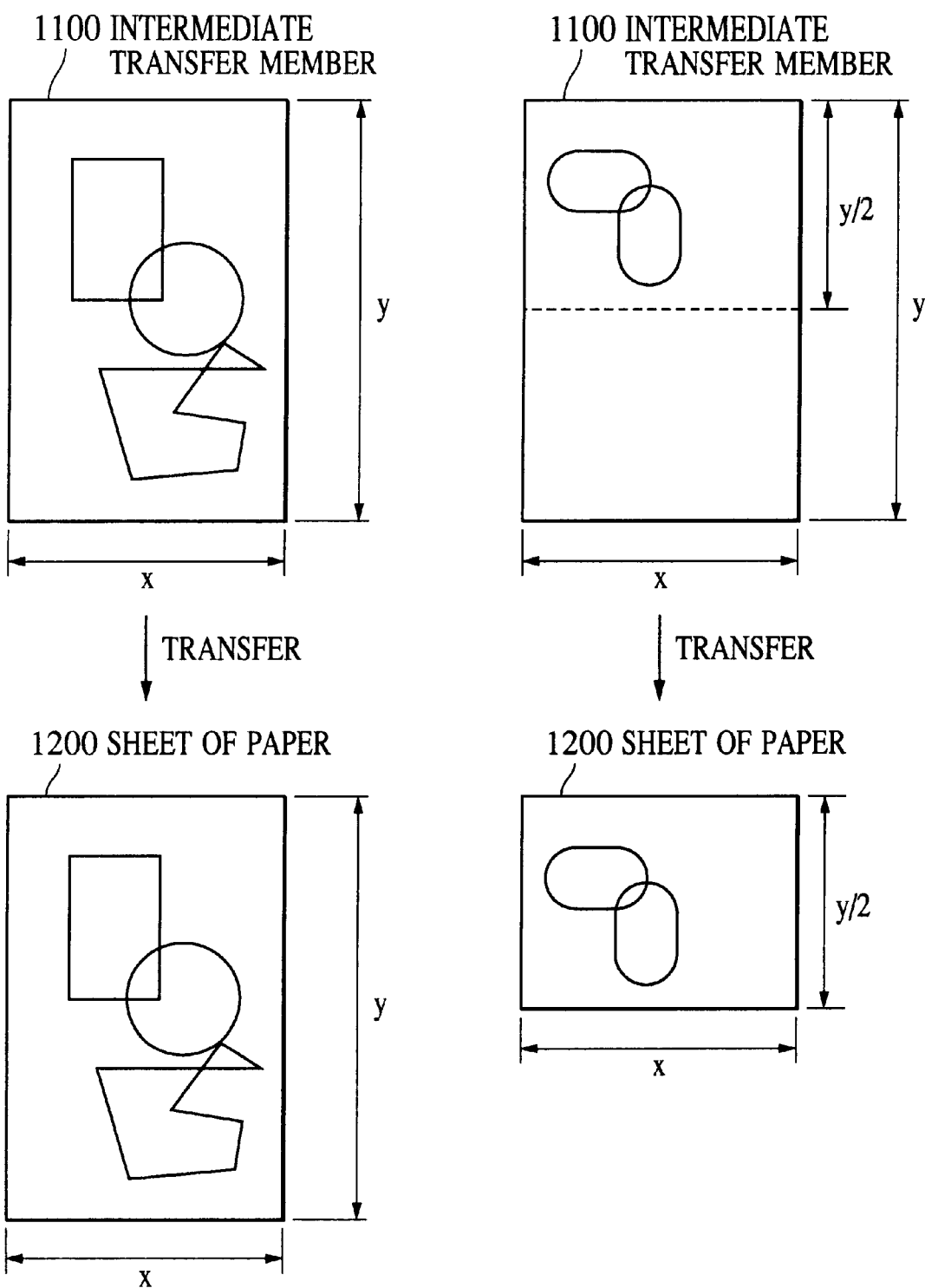
FIG. 12 is an explanatory view for explaining the problem in the printing system using the intermediate transfer member.

FIG. 10 is a flowchart for control of a printing run routine. When the printing run routine is started up (step S11), the page forming mode is informed to the engine 103 (step S12), and the PRINT signal is shifted to the TRUE level (step S13), followed by waiting for a shift of the TOP signal to the TRUE level (step S14). If the TRUE level of the TOP signal is detected, the DMA control unit 308 and the engine interface 306 are actuated to start image transfer (step S15), ending the routine with completion of the image transfer (step S16). Thus, the printing is performed in the 1-page forming mode or the 2-page forming mode in accordance with any of the signal sequences shown in FIG. 3 (monochromatic printing) and FIG. 4 (color printing).

The above description has been made in connection with an example of the control procedure in which when two successive pages each have an image size not greater than ½ of the maximum sheet size, toner images for the two pages are formed on the intermediate transfer drum 205 prior to transfer of the toner images to a sheet of paper. However, the number of pages formed on the intermediate transfer drum 205 is not limited to two, when the page size is even smaller than ½ of the maximum sheet size, toner images for a larger number of pages can be formed on the intermediate transfer drum 205.

With the above embodiment, as described above, when a plurality of successive pages each have an image size not greater than ½ of the maximum sheet size, a throughput of the printing process can be maximized by forming toner images for the plurality of pages on the intermediate transfer drum 205 prior to transfer of the toner images to a sheet of paper. Simultaneously, a printing output with high quality free from displacements of color images can be obtained by the printing process utilizing the intermediate transfer.

In addition, with the above embodiment, only when a plurality of successive pages each have an image size not greater than ½ of the maximum sheet size and the image forming conditions for those pages are the same, toner images for the plurality of pages are formed on the intermediate transfer drum 205. Stated otherwise, whether the 2-page forming mode can be performed is determined depending on whether the image forming conditions are the same among the plural pages. Accordingly, the engine 103 is not required to determine as for whether or not to perform the 2-page forming mode, and therefore the apparatus and the control software can be constructed simply and inexpensively. Furthermore, precise formation of images can be achieved under the image forming conditions as designated from the external device 101 such as the host computer.

Particularly, with the above embodiment, forming a plurality of successive pages on the intermediate transfer drum 205 is determined on condition that the image forming conditions given by designation (change) of various parameters, i.e., the transport mode (whether or not to reverse the sheet of paper and feed it again) 807, the paper feed mode (selection of the paper inlet) 810, the color mode 808, the paper ejection mode 809, the sheet size 811, the printing mode 812, the toner density 813, and the resolution 814, are coincident with each other among the plurality of successive pages. Therefore, the 2-page forming mode can be made allowable to run only when the image forming conditions are coincident with each other. For example, if any of the image forming conditions differs for pages among the successive pages, the 1-page forming mode is employed. Accordingly, the image forming conditions can be precisely reproduced as designated from the external device 101 such as the host computer without causing undesirable errors, and the formation of images with high quality can be achieved.

The present invention is effective for a printing apparatus of the electrophotographic type wherein toner images for a plurality of pages are formed prior to transfer of the toner images to a sheet of paper. Also, the present invention is applicable to a monochromatic laser beam printer regardless of the image forming system so long as an image forming apparatus employs an intermediate transfer member.

The control procedures in the present invention can be supplied to a printing apparatus in the form of a program for a controller (such as a CPU) of the printing apparatus, the program being stored in any desired computer-readable storage medium.

While the above embodiment has been described in connection with the case of using an intermediate transfer drum as an image carrier, the image carrier may be an intermediate transfer belt. Alternatively, the image carrier may be a drum-shaped body to which a sheet of paper (recording medium) is affixed. In the latter case, the drum-shaped body with the sheet of paper or the like affixed to it serves as the image carrier in the present invention.

It is to be understood that the above description of the present invention is not by way of limitation, and various modifications will occur to those skilled in the art without departing from the scope of the present invention.

What is claimed is:

1. A printing apparatus including image forming means which has an image carrier for holding an image, operates in a first image forming mode to form an image for a single page on said image carrier and in a second image forming mode to form images for a plurality of pages on said image carrier, and performs image formation in one of the first image forming mode and the second image forming mode, said printing apparatus comprising:

receiving means for receiving printing data from an external device;

means for analyzing said printing data to obtain image data and image forming condition information in units of page; and control means for selecting one of the first image forming mode and the second image forming mode depending on the image forming condition information, thereby rendering the image formation to be performed in the selected mode.

2. A printing apparatus according to claim 1, further comprising storage means capable of storing the image data and the image forming condition information for a plurality of pages, wherein said control means determines which one of the first image forming mode and the second image forming mode is to be used for printing the image data for the plurality of pages, based on the image forming condition information stored in said storage means and corresponding to the image data for the plurality of pages.

3. A printing apparatus according to claim 2, wherein said image forming means includes a plurality of paper feed means, said image forming condition information includes information indicating a designated one of said plurality of paper feed means, and said control means includes means for determining whether the same paper feed means is employed for printing the image data for the plurality of pages stored in said storage means.

4. A printing apparatus according to claim 2, wherein said image forming means has a function of printing an image in one transport mode selected from a one-side printing mode to print an image on one side of a recording medium and a both-side printing mode to print images on both sides of a recording medium, said image forming condition information includes information indicating the designated transport mode, and said control means includes means for determining whether the same transport mode is designated for the image data for the plurality of pages stored in said storage means.

5. A printing apparatus according to claim 2, wherein said image forming means has a function of printing an image in one color mode selected from a full-color mode in which images formed for each color are held on said image carrier in superimposed relation and transferred to a recording medium and a monochromatic mode in which an image of single color is held on said image carrier and transferred to a recording medium, said image forming condition information includes information indicating the designated color mode, and said control means includes means for determining whether the same color mode is designated for the image data for the plurality of pages stored in said storage means.

6. A printing apparatus according to claim 2, wherein said image forming means includes a plurality of paper ejection means, said image forming condition information includes information indicating designated one of said plurality of paper ejection means, and said control means includes means for determining whether the same paper ejection means is employed for printing the image data for the plurality of pages stored in said storage means.

7. A printing apparatus according to claim 2, wherein said image forming condition information includes information regarding a designated image size, and said control means includes means for determining whether the same image size is designated for the image data for the plurality of pages stored in said storage means.

8. A printing apparatus according to claim 2, wherein said image forming means has a function of controlling a control parameter of an image forming process, said image forming condition information includes information indicating the designated control parameter, and said control means includes means for determining whether the same control parameter of the image forming process is designated for the image data for the plurality of pages stored in said storage means.

9. A printing apparatus according to claim 2, wherein said image forming means has a function of controlling an image density in image formation, said image forming condition information includes information indicating the designated image density, and said control means includes means for determining whether the same image density is designated for printing the image data for the plurality of pages stored in said storage means.

10. A printing apparatus according to claim 2, wherein said image forming means has a function of controlling resolution of an image to be printed, said image forming condition information includes information indicating the designated resolution, and said control means includes means for determining whether the same resolution is designated for printing the image data for the plurality of pages stored in said storage means.

11. A control method for a printing apparatus including image forming means which has an image carrier for holding an image, operates in a first image forming mode to form an image for a single page on said image carrier and in a second image forming mode to form images for a plurality of pages on said image carrier, and performs image formation in one of the first image forming mode and the second image forming mode, said control method comprising:
 a step of receiving printing data from an external device;
 a step of analyzing said printing data to obtain image data and image forming condition information in units of page; and
 a control step of selecting one of the first image forming mode and the second image forming mode depending on the image forming condition information, thereby rendering the image formation to be performed in the selected mode.

12. A control method for a printing apparatus according to claim 11, wherein said control step includes a step of determining which one of the first image forming mode and the second image forming mode is to be used for printing the image data for a plurality of pages, based on the image forming condition information stored in storage means and corresponding to the image data for the plurality of pages, said storage means being capable of storing the image data and the image forming condition information for the plurality of pages.

13. A control method for a printing apparatus according to claim 12, wherein said image forming means includes a plurality of paper feed means, said image forming condition information includes information indicating a designated one of said plurality of paper feed means, and said control step includes a step of determining whether the same paper feed means is employed for printing the image data for the plurality of pages stored in said storage means.

14. A control method for a printing apparatus according to claim 12, wherein said image forming means has a function of printing an image in one transport mode selected from a one-side printing mode to print an image on one side of a recording medium and a both-side printing mode to print images on both sides of a recording medium, said image forming condition information includes information indicating the designated transport mode, and said control step includes a step of determining whether the same transport mode is designated for the image data for the plurality of pages stored in said storage means.

15. A control method for a printing apparatus according to claim 12, wherein said image forming means has a function of printing an image in one color mode selected from a full-color mode in which images formed for each color are held on said image carrier in superimposed relation and transferred to a recording medium and a monochromatic mode in which an image of single color is held on said image carrier and transferred to a recording medium, said image forming condition information includes information indicating the designated color mode, and said control step includes a step of determining whether the same color mode is designated for the image data for the plurality of pages stored in said storage means.

16. A control method for a printing apparatus according to claim 12, wherein said image forming means includes a plurality of paper ejection means, said image forming condition information includes information indicating designated one of said plurality of paper ejection means, and said control step includes a step of determining whether the same paper ejection means is employed for printing the image data for the plurality of pages stored in said storage means.

17. A control method for a printing apparatus according to claim 12, wherein said image forming condition information includes information regarding a designated image size, and said control step includes a step of determining whether the same image size is designated for the image data for the plurality of pages stored in said storage means.

18. A control method for printing apparatus according to claim 12, wherein said image forming means has a function of controlling a control parameter of an image forming process, said image forming condition information includes information indicating the designated control parameter, and said control step includes a step of determining whether the same control parameter of the image forming process is designated for the image data for the plurality of pages stored in said storage means.

19. A control method for a printing apparatus according to claim 12, wherein said image forming means has a function of controlling an image density in image formation, said image forming condition information includes information indicating the designated image density, and said control step includes a step of determining whether the same image density is designated for printing the image data for the plurality of pages stored in said storage means.

20. A control method for a printing apparatus according to claim 12, wherein said image forming means has a function of controlling resolution of an image to be printed, said image forming condition information includes information indicating the designated resolution, and said control step includes a step of determining whether the same resolution is designated for printing the image data for the plurality of pages stored in said storage means.

21. A computer-readable storage medium storing a control program for a printing apparatus including image forming means which has an image carrier for holding an image, operates in a first image forming mode to form an image for a single page on said image carrier and in a second image forming mode to form images for a plurality of pages on said image carrier, and performs image formation in one of the first image forming mode and the second image forming mode, said control program containing:

a step of receiving printing data from an external device;

a step of analyzing said printing data to obtain image data and image forming condition information in units of page; and a control step of selecting one of the first image forming mode and the second image forming mode depending on the image forming condition information, thereby rendering the image formation to be performed in the selected mode.

22. A computer-readable storage medium storing a control program for a printing apparatus according to claim 21, wherein said control step includes a step of determining which one of the first image forming mode and the second image forming mode is to be used for printing the image data for a plurality of pages, based on the image forming condition information stored in storage means and corresponding to the image data for the plurality of pages, said storage means being capable of storing the image data and the image forming condition information for the plurality of pages.

23. A computer-readable storage medium storing a control program for a printing apparatus according to claim 22, wherein said image forming means includes a plurality of paper feed means, said image forming condition information includes information indicating a designated one of said plurality of paper feed means, and said control step includes a step of determining whether the same paper feed means is employed for printing the image data for the plurality of pages stored in said storage means.

24. A computer-readable storage medium storing a control program for a printing apparatus according to claim 22, wherein said image forming means has a function of printing an image in one transport mode selected from a one-side printing mode to print an image on one side of a recording medium and a both-side printing mode to print images on both sides of a recording medium, said image forming condition information includes information indicating the designated transport mode, and said control step includes a step of determining whether the same transport mode is designated for the image data for the plurality of pages stored in said storage means.

25. A computer-readable storage medium storing a control program for a printing apparatus according to claim 22, wherein said image forming means has a function of printing an image in one color mode selected from a full-color mode in which images formed for each color are held on said image carrier in superimposed relation and transferred to a recording medium and a monochromatic mode in which an image of single color is held on said image carrier and transferred to a recording medium, said image forming condition information includes information indicating the designated color mode, and said control step includes a step of determining whether the same color mode is designated for the image data for the plurality of pages stored in said storage means.

26. A computer-readable storage medium storing a control program for a printing apparatus according to claim 22, wherein said image forming means includes a plurality of paper ejection means, said image forming condition information includes information indicating designated one of said plurality of paper ejection means, and said control step includes a step of determining whether the same paper ejection means is employed for printing the image data for the plurality of pages stored in said storage means.

27. A computer-readable storage medium storing a control program for a printing apparatus according to claim 22, wherein said image forming condition information includes information regarding a designated image size, and said control step includes a step of determining whether the same image size is designated for the image data for the plurality of pages stored in said storage means.

28. A computer-readable storage medium storing a control program for a printing apparatus according to claim 22, wherein said image forming means has a function of controlling a control parameter of an image forming process, said image forming condition information includes information indicating the designated control parameter, and said control step includes a step of determining whether the same control parameter of the image forming process is designated for the image data for the plurality of pages stored in said storage means.

29. A computer-readable storage medium storing a control program for a printing apparatus according to claim 22, wherein said image forming means has a function of controlling an image density in image formation, said image forming condition information includes information indicating the designated image density, and said control step includes a step of determining whether the same image density is designated for printing the image data for the plurality of pages stored in said storage means.

30. A computer-readable storage medium storing a control program for a printing apparatus according to claim 22, wherein said image forming means has a function of controlling resolution of an image to be printed, said image forming condition information includes information indicating the designated resolution, and said control step includes a step of determining whether the same resolution is designated for printing the image data for the plurality of pages stored in said storage means.

* * * * *